United States Patent
Fudge et al.

(10) Patent No.: US 8,509,354 B2
(45) Date of Patent: Aug. 13, 2013

(54) SYSTEM AND METHOD FOR IMPROVED SPUR REDUCTION IN DIRECT RF RECEIVER ARCHITECTURES

(75) Inventors: Gerald L. Fudge, Rockwall, TX (US); Ross E. Bland, Dallas, TX (US); Sujit Ravindran, Dallas, TX (US); Mark A. Chivers, McKinney, TX (US)

(73) Assignee: L—3 Communications Integrated Systems L.P., Greenville, TX (US)

( * ) Notice: Subject to any disclaimer, the term of this patent is extended or adjusted under 35 U.S.C. 154(b) by 922 days.

(21) Appl. No.: 12/592,777

(22) Filed: Dec. 2, 2009

(65) Prior Publication Data

US 2010/0202566 A1 Aug. 12, 2010

Related U.S. Application Data

(60) Provisional application No. 61/203,115, filed on Dec. 18, 2008.

(51) Int. Cl.
*H04L 27/00* (2006.01)

(52) U.S. Cl.
USPC ............ 375/324; 375/130; 375/147; 375/316

(58) Field of Classification Search
USPC ........................................................ 375/324
See application file for complete search history.

(56) References Cited

U.S. PATENT DOCUMENTS

| | | | |
|---|---|---|---|
| 3,766,480 A | 10/1973 | Belloc et al. | |
| 5,014,018 A | 5/1991 | Rodwell et al. | |
| 5,454,007 A | 9/1995 | Dutta | |
| 6,266,518 B1 | 7/2001 | Sorrells et al. | |
| 6,507,624 B1 | 1/2003 | Jachim et al. | |
| 6,574,459 B1 | 6/2003 | Kaminski et al. | |
| 6,639,537 B1 | 10/2003 | Raz | |
| 6,700,388 B1 | 3/2004 | Mayor et al. | |
| 6,900,710 B2 | 5/2005 | Agoston et al. | |
| 7,107,033 B2 | 9/2006 | du Toit | |

(Continued)

FOREIGN PATENT DOCUMENTS

EP    1330036 A1    7/2003

OTHER PUBLICATIONS

Fudge et al., "Multiple Projection Sampling for RF Sampling Receivers", Copending U.S. Appl. No. 13/048,489, filed Mar. 15, 2011, 41 pgs.

(Continued)

*Primary Examiner* — Lihong Yu
(74) *Attorney, Agent, or Firm* — Egan, Peterman & Enders LLP

(57) ABSTRACT

Improved spur reduction architectures that improve linearity in direct radio frequency (RF) receiver architectures. Non-uniform sampling in the form of sampling clock phase (or frequency) modulation is used to induce phase (or frequency) modulation on signals that are being received from a given Nyquist zone. At the output of the ADC (analog-to-digital converter), the signals are de-modulated to remove the induced modulation based on the Nyquist zone that is being received. The de-modulation process results in non-desired spurious artifacts (interfering leakage signals and ADC spurs) being spread in the frequency domain. Strong spurious artifacts may be removed after measuring the induced modulation and de-modulating. For the case of weak spurious artifacts, the de-modulation for the desired Nyquist zone spread these signals in the frequency domain. Induced modulation on signals may also provide a dithering effect on the ADC.

24 Claims, 10 Drawing Sheets

(56) References Cited

U.S. PATENT DOCUMENTS

| | | | |
|---|---|---|---|
| 7,436,910 B2 | 10/2008 | Fudge et al. | |
| 7,436,911 B2 | 10/2008 | Fudge et al. | |
| 7,436,912 B2 | 10/2008 | Fudge et al. | |
| 7,489,745 B2 | 2/2009 | Fudge | |
| 2002/0161300 A1 | 10/2002 | Hoff et al. | |
| 2003/0016762 A1 | 1/2003 | Martin et al. | |
| 2003/0054783 A1 | 3/2003 | Mason et al. | |
| 2005/0069046 A1 | 3/2005 | Tsui et al. | |
| 2005/0117069 A1 | 6/2005 | McNeely | |
| 2006/0133470 A1 | 6/2006 | Raz et al. | |
| 2007/0081578 A1* | 4/2007 | Fudge et al. | 375/130 |

OTHER PUBLICATIONS

Arthur, "Modern SAW-based pulse compression systems for radar applications, Part 1: SAW matched filters," Electronics & Communication Engineering Journal, Dec. 1995, pp. 236-246.
Arthur, "Modern SAW-based pulse compression systems for radar applications, Part II: Practical systems," Electronics & Communication Engineering Journal, Apr. 1996, pp. 57-78.
Brandl et al., "High Speed Signal Processing with Tapped Dispersive SAW based Delay Lines," University of Technology, Applied Electronics Laboratory, Vienna Austria, IEEE 2000, pp. 171-176.
Burke, "Ultra-Linear Chirp Generation Via VCO Tuning Predistortion," AIL Systems, Inc., Deer Park, New York, IEEE 1994 MTT-S Digest, pp. 957-960.
Gerard et al., "The Design and Applications of Highly Dispersive Acoustic Surface-Wave Filters," Invited Paper, IEEE Transactions on Microwave Theory and Techniques, vol. MTT-21, No. 4, Apr. 1973, pp. 176-186.
Ong et al., "Digital LPI Radar Detector," Naval Postgraduate School Thesis, Monterey, California, Mar. 2001, pp. 1-81.
Grant et al., "Recent Advances in Analog Signal Processing," IEEE 1990, IEEE Transactions on Aerospace and Electronic Systems, vol. 26, No. 5, Sep. 1990, pp. 818-849.
Li et al, "On the Use of a Compressive Receiver for Signal Detection," IEEE 1991, IEEE Transactions on Communications, vol. 39, No. 4, Apr. 1991, pp. 557-566.
Levy et al, "VCO Based Chirp Generation for Broad Bandwidth Compressive Receiver Applications," AIL Systems, Inc., Deer Park, New York, IEEE 1993 MTT-S Digest, pp. 1113-1115.
Lucyszyn, "Review of radio frequency microelectromechanical systems technology," Imperial College, London, IEE Proc.-Sci. Meas. Technol.vol. 151, No. 2, Mar. 2004, pp. 93-103.
Lyons et al., "High Temperature Superconductive Wideband Compressive Receivers," Analog Device Technology Group, Lincoln Laboratory, Invited Paper, IEEE Transactions on Microwave Theory and Techniques, vol. 44, No. 7, Jul. 1996, pp. 1258-1278.
Unser, "Sampling—50 Years After Shannon," Swiss Federal Institute of Technology, Lausanne, Switzerland, IEEE 2000 Proceedings of the IEEE, vol. 88, No. 4, Apr. 2000, pp. 569-587.
Sengupta et al, "Novel Ferroelectric Materials for Phased Array Antennas," U.S. Army Research Laboratory, Aberdeen Proving Groud, 1997 IEEE, IEEE Transactions on Ultrasonics, Ferroelectrics, and Frequency Control, vol. 44, No. 4, Jul. 1997, pp. 792-797.
Serhan et al., "Automatic Frequency Control Techniques for Microwave Active Filters," Limoges University, Limoges, France, 1997 IEEE MTT-S Digest, pp. 697-700.
Whittaker et al, "Digital chirp filter processing for improved performance of sweeping spectrum analysers," University of Surrey, Surrey, UK, Electronics Letters, Aug. 3, 2000, vol. 36, No. 16, pp. 1430-1432.
Agoston et al, "100 GHz Through-Line Sampler System with Sampling Rates in Excess of 10 G samples/second," Picosecond Pulse Labs, Boulder, Colorado, PSPL-100 Sampler Paper—Submitted to MTT 2003, http://www.picosecond.com->products->sampler modules, 3 pgs.

Akbari-Dilmaghani et al, "A High Q RF CMOS Differential Active Inductor," Imperial College, London, 1998 IEEE International Conference on Electronics, Circuits and Systems, vol. 3, Sep. 7-10, 1998, pp. 157-160.
Akos et al, "Direct Bandpass Sampling of Multiple Distinct RF Signals," 1999 IEEE Transactions on Communications, Vo. 47, No. 7, Jul. 1999, pp. 983-988.
Behbahani et al, "A Broad-Band Tunable CMOS Channel-Select Filter for a Low-IF Wireless Receiver," 2000 IEEE Journal of Solid-State Circuits, vol. 35, No. 4, Apr. 2000, pp. 476-489.
Brown et al, "Digital L-Band Receiver Architecture with Direct RF Sampling," NAVSYS Corp., Colorado Springs, Colorado, Position Location and Navigation Symposium, 1994, IEEE, Apr. 11-15, 1994, pp. 209-216.
Copeland et al, "5-GHz SiGe HBT Monolithic Radio Transceiver with Tunable Filtering," 2000 IEEE Transactions on Microwave Theory and Techniques, vol. 48, No. 2, Feb. 2000, pp. 170-181.
Deleniv et al, "Tunable Ferroelectric Filter-Phase Shifter," University of Technology, Gothenburg, Sweden, 2003 IEEE MTT-S Digest, pp. 1267-1270.
Juodawlkis et al, "Optical Down-Sampling of Wide-Band Microwave Signals," Invited Paper, Journal of Lightwave Technology, vol. 21, No. 12, Dec. 2003, pp. 3116-3124.
Karvonen et al, "A CMOS Quadrature Charge-Domain Sampling Circuit with 66-dB SFDR Up to 100 MHz," 2005 IEEE Transactions on Circuits and Systems-I: Regular Papers, vol. 52, No. 2, Feb. 2005, pp. 292-304.
Koc et al, "Direct RF Sampling Continuous-Time Bandpass /spl Delta/-/spl Sigma/A/D Converter Design for 3G Wireless Applications," ISCAS 2004, May 23-26, 2004, vol. 1, pp. 409-412.
Latiri et al, "A reconfigurable RF sampling receiver for multistandard applications," Comptes Rendus Physique 7 (2006), pp. 785-793.
Lindfors et al, "A 3-V 230-MHz CMOS Decimation Subsampler," 2003 IEEE Transactions on Circuits and Systems-II: Analog and Digital Signal Processing, vol. 50. No. 3, Mar. 2003, pp. 105-117.
Loper, "A Tri-Phase Direct Conversion Receiver," Rockwell International, MILCOM 1990, Sep. 30-Oct. 3, 1990, pp. 1228-1232.
Luy et al, "Configurable RF Receiver Architecture," Daimler-Chrysler Research and Tecnology, Ulm, Germany, 2004 IEEE Microwave Magazine, Mar. 2004, pp. 75-82.
Minnis et al, "A Highly Digitized Multimode Receiver Architecture for 3G Mobiles," 2003 IEEE Transactions on Vehicular Technology, vol. 52, No. 3, May 2003, pp. 637-653.
Mirabbasi et al, "Classical and Modern Receiver Architectures," University of Toronto, 2000 IEEE Communications Magazine, Nov. 2000, pp. 132-139.
Mostafa et al, "WCDMA Receiver Architecture with Unique Frequency Plan," Micro Lnear Corp. San Jose, California and Texas Instruments, Inc., Dallas, Texas, ASIC/SOC Conference, 2001 Proceedings, 14th Annual IEEE International, Sep. 12-15, 2001, pp. 57-61.
Muhammad et al, "Direct RF Sampling Mixer With Recursive Filtering in Charge Domain," Texas Instruments Incorporated, Dallas, Texas, ISCAS, May 23-26, 2004, vol. 1, pp. 577-580.
Namgoong et al., "Direct-Conversion RF Receiver Design," 2001 IEEE Transactions on Communications, vol. 49, No. 3, Mar. 2001, pp. 518-529.
Pellon, "RF-to-Digital Receivers Employing Bandpass Multibit /spl Sigma//spl Delta/ ADC Architectures," Lockheed Martin Government Electronic Systems, Morristown, New Jersey, 20th Annual Gallium Arsenide Integrated Circuit (GaAs IC) Symposium, Nov. 1-4, 1998, pp. 11-14.
"Real-Time Sampling Downconverter Front Ends for Digital Radar and Wide-Bank Signaling," Picoscond Pulse Labs, 2500 55th Street, Boulder, CO 80301, (Nov. 2004).
Richter et al, "An Integrated Wideband-IF-Receiver Architecture for Mobile Terminals," Dresden University of Technology, Dresden, Germany, 2003 IEEE Radio Frequency Integrated Circuits Symposium, Jun. 8-10, 2003, pp. 583-586.
Shoji et al, "70-GHz-Band MMIC Transceiver With Integrated Antenna Diversity System: Application of Receive-Module-Arrayed Self-Heterodyne Technique," 2004 IEEE Transactions on Microwave Theory and Techniques, vol. 52, No. 11, Nov. 2004, pp. 2541-2549.

Springer et al, "RF System Concepts for Highly Integrated RFICs for W-CDMA Mobile Radio Terminals," 2002 IEEE Transactions on Microwave Theory and Techniques, vol. 50, No. 1, Jan. 2002, pp. 254-267.

Tatu et al, "Ka-Band Direct Digital Receiver," 2002 IEEE Transactions on Microwave Theory and Techniques, vol. 50, No. 11, Nov. 2002, pp. 2436-2442.

Tayebati et al, "Microelectromechanical tuneable filters with 0.47 nm linewidth and 70nm tuning range," Electonics Letters, Jan. 8, 1998, vol. 34, No. 1, pp. 76-78.

Thor et al, "A Direct RF Sampling Multifrequency GPS Receiver," Stanford University, Position Location and Navigation Symposium, 2002 IEEE, Apr. 15-18, 2002, pp. 44-51.

Tsui et al, "Digital Microwave Receiver Technology," Invited Paper, 2002 IEEE Transactions on Microwave Theory and Techniques, vol. 50, No. 3, Mar. 2002, pp. 699-705.

Valkama et al., "Advanced Receiver Architectures and I/Q Signal Processing," Tampere University of Technology, Tampere, Finland, First International Symposium on Control, Communications and Signal Processing, IEEE Jun. 2004, pp. 71-74.

Vaughan et al, "The Theory of Bandpass Sampling," 1991 IEEE Transactions on Signal Processing, vol. 39, No. 9, Sep. 1991, pp. 1973-1984.

Wooten et al, "Rapidly Tunable Narrowband Wavelength Filter Using LiNbO3 Unbalanced Mach-Zehnder Interferometers," Journal of Lightwave Technology, vol. 14, No. 11, Nov. 1996, pp. 2530-2536.

Pepper et al, "NLTLs Push Sampler Products Past 100 GHz," Microwaves & RF, Oct. 2005, 6 pgs.

Model 7620 DCSM VME Card Datasheet, Revision C, Picosecond Pulse Labs, Boulder, Colorado, Sep. 2005, 10 pgs.

Wepman, "Analog-to-Digital Converters and Their Applications in Radio Receivers," 1995 IEEE Communications Magazine, May 1995, pp. 39-45.

U.S. Appl. No. 60/373,163, filed Apr. 17, 2002, "Tunable modules for frequency agile receivers."

Brueller et al, "On Non-uniform Sampling of Signals," Israel Institute of Technology, Haifa, Israel, ISIE, Jul. 7-10, 1998, pp. 249-252.

Candes et al, "Robust Uncertainty Principles: Exact Signal Reconstruction From Highly Incomplete Frequency Information," 2006 IEEE Transactions on Information Theory, Vo. 52, No. 2, Feb. 2006, pp. 489-509.

Donoho, "Compressed Sensing," 2006 IEEE Transactions on Information Theory, vol. 52, No. 4., Apr. 2006, pp. 1289-1306.

Dragotti et al, "Exact Sampling Results for Signals with Finite Rate of Innovation Using Strang-Fix Conditions and Local Kernels," ICASSP 2005, Mar. 18-23, 2005, pp. 233-236.

Dragotti et al, "Wavelet Footprints: Theory, Algorithms, and Applications," 2003 IEEE Transactions on Signal Processing, vol. 51, No. 5, May 2003, pp. 1306-1323.

Duarte et al, "Distributed Compressed Sensing of Jointly Sparse Signals," Rice University, Houston, Texas, Asilomar Conference on Signals, Systems and Computers 2005, Oct. 28-Nov. 1, 2005, pp. 1537-1541.

Gansman et al, "Single Frequency Estimation with Non-uniform Sampling," Asilomar Conference on Signals, Systems and Computers 1996, Nov. 3-6, 1996, vol. 1., pp. 399-403.

Herley et al, "Minimum Rate Sampling and Reconstruction of Signals with Arbitrary Frequency Support," 1999 IEEE Transactions on Information Theory, vol. 45, No. 5, Jul. 1999, pp. 1555-1564.

Kumar et al, "On Distributed Sampling of Bandlimited and Non-Bandlimited Sensor Fields," University of California, Berkeley, California, ICASSP 2004, May 17-21, 2004 vol. III., pp. 925-928.

Lefkaditis et al., Ambiguities in the harmonic retrieval problem using non-uniform sampling, IEE Proceedings—Radar, Sonar and Navigation, Dec. 2001, pp. 325-329.

Maravic et al, "Channel Estimation and Synchronization with Sub-Nyquist Sampling and Application to Ultra-Wideband Systems," ISCAS 2004, May 23-26, 2004, pp. V-381-V-384.

Maravic et al, "Sampling and Reconstruction of Signals With Finite Rate of Innovation in the Presence of Noise," 2005 IEEE Transactions on Signal Processing, vol. 53, No. 8, Aug. 2005, pp. 2788-2805.

Pace et al, "Use of the Symmetrical Number System in Resolving Single-Frequency Undersampling Aliases," 1997 IEEE Transactions on Signal Processing, vol. 45, No. 5, May 1997, pp. 1153-1160.

Sanderson et al, "Reduction of Aliasing Ambiguities Through Phase Relations," 1992 IEEE Transactions on Aerospace and Electronic Systems, vol. 28, No. 4, Oct. 1992, pp. 950-956.

Sayiner et al, "A Non-Uniform Sampling Technique for A/D Conversion," ISCAS 193, May 3-6, 1993, pp. 1220-1223.

Styer et al, "Two Channel RSNS Dynamic Range," 2002 IEEE Transactions on Circuits and Systems—I: Fundamental Theory and Applications, vol. 49, No. 3., Mar. 2002, pp. 395-397.

Vetterli et al, "Sampling Signals With Finite Rate of Innovation," 2002 IEEE Transactions on Signal Processing, vol. 50, No. 6, Jun. 2002, pp. 1417-1428.

Walter, "Non-Uniform Sampling in Wavelet Subspaces," University of Wisconsin, Milwaukee, Wisconsin, ICASSP 1999, pp. 2057-2059.

Xia, "An Efficient Frequency-Determination Algorithm from Multiple Undersampled Waveforms," 2000 IEEE Transactions on Signal Processing Letters, vol. 7, No. 2, Feb. 2000, pp. 34-37.

Xiong et al, "A Non-uniform Sampling Tangent Type FM Demodulation," 2004 IEEE Transactions on Consumer Electronics, vol. 50, No. 3., Aug. 2004, pp. 844-848.

Zhu et al, "Adaptive Non-Uniform Sampling Delta Modulation for Audio/Image Processing," 1996 IEEE Transactions on Consumer Electronics, vol. 42, No. 4, Nov. 1996, pp. 1062-1072.

Weller et al., "Jitter Compensation in Sampling Via Polynomial Least Squares Estimation", 2009, 4 pgs.

Weller et al., "Nonlinear Digital Post-Processing to Mitigate Jitter in Sampling", Sep. 2008, 24 pgs.

Fudge et al., "System and Method for Clock Jitter Compensation in Direct RF Receiver Architectures", Provisional Application LCOM:086PZ1, U.S. Appl. No. 61/203,114, filed Dec. 18, 2008; 10 pgs.

Fudge et al., "System and Method for Improved Spur Reduction in Direct RF Receiver Architectures", Provisional Application LCOM:087PZ1, U.S. Appl. No. 61/203,115, filed Dec. 18, 2008; 17 pgs.

Tarczynski et al., "Optimal Periodic Sampling Sequences for Nearly-Alias Free Digital Signal Processing", IEEE, 2005, 4 pgs.

Artyukh et al., "Wideband RF Signal Digitising for High Pruity Spectral Analysis", International Workshop on Spectral Methods and Multirate Signal Processing, Jun. 2005, 6 pgs.

Fudge et al., "System and Method for Clock Jitter Compensation in Direct RF Receiver Architectures", Copending U.S. Appl. No. 12/592,776, filed Dec. 2, 2009, 26 pgs.

* cited by examiner

SYSTEM AND METHOD FOR IMPROVED SPUR REDUCTION IN DIRECT RF RECEIVER ARCHITECTURES

RELATED APPLICATIONS

The present application claims priority to U.S. provisional patent application Ser. No. 61/203,115 filed Dec. 18, 2008 and entitled "SYSTEM AND METHOD FOR IMPROVED SPUR REDUCTION IN DIRECT RF RECEIVER ARCHITECTURES", by Fudge et al., the disclosure of which is incorporated herein by reference in its entirety.

The present application is related in subject matter to concurrently filed patent application Ser. No. 12/592,776 entitled "SYSTEM AND METHOD FOR CLOCK JITTER COMPENSATION IN DIRECT RF RECEIVER ARCHITECTURES" by Fudge et al., which is incorporated herein by reference in its entirety, and to Provisional Patent Application serial number 61/203,114 filed Dec. 18, 2008 and entitled "SYSTEM AND METHOD FOR CLOCK JITTER COMPENSATION IN DIRECT RF RECEIVER ARCHITECTURES" by Fudge et al., which is also incorporated herein by reference in its entirety.

TECHNICAL FIELD OF THE INVENTION

This invention relates to receiver and transmitter architectures for efficient wireless communications and, more particularly, to direct radio frequency (RF) receiver architectures.

BACKGROUND

A wide variety of signals and related protocols exist for the use of radio frequency (RF) signals in communication systems and other devices, such as radar systems. Prior receiver architectures for such RF communication systems are described in U.S. Pat. No. 7,436,910, entitled "DIRECT BANDPASS SAMPLING RECEIVERS WITH ANALOG INTERPOLATION FILTERS AND RELATED METHODS," and U.S. patent application Ser. No. 7,436,912, entitled "NYQUIST FOLDED BANDPASS SAMPLING RECEIVERS AND RELATED METHODS," each of which is hereby incorporated by reference in its entirety.

FIG. 1 (Prior Art) shows an embodiment for a reconfigurable direct RF bandpass sampling receiver (RDRFBSR), such as those described in U.S. Pat. No. 7,436,910. As depicted, the radio frequency (RF) input signal 116 is first passed through a low noise amplifier (LNA) 102. The output 130 of the LNA 102 is provided to a tunable/switchable bandpass filter 104, which can be configured to have a tunable center frequency and a programmable bandwidth dependent upon one or more filter control signals 105. The filtered output signal 132 is received by the non-quantizing sampler 204, which samples the signals at times determined by the RF sample clock 212 resulting in a discrete time continuous voltage sampled signal. The sampled signal is then filtered by the interpolation filter, resulting in a continuous time continuous voltage signal, which is then sampled and quantized by the ADC 210 at sample rate determined by the ADC Sample Clock 214 after optional amplification by the IF amp 208. The digital output signals from the ADC 210 are then further processed by digital signal processing (DSP) circuitry 114 to produce baseband in-phase path (I) and quadrature path (Q) signals. One limitation of this architecture, however, is that for very high RF input signals and operational conditions, the RF Sample Clock 212 jitter is amplified and may result in subsequent signal distortion in the form of signal spreading in the output signals, leading to significantly reduced SNR.

One limitation of this architecture of FIG. 1, however, is that for very high RF input signals and wide RF range operational conditions, developing a tunable/switchable filter over a wide RF range with high Q is very difficult and costly; thus it is difficult to control the filter skirts sufficiently to avoid signal leakage from adjacent Nyquist zones through the anti-alias filter. In addition, no provision is made for signal distortion in the form of ADC (analog-to-digital converter) induced spurs in the output signals.

FIG. 2 (Prior Art) shows an embodiment of a Nyquist folding receiver (NYFR) 200, such as those described in U.S. Pat. No. 7,436,912. The NYFR is similar to the RDRFBSR. Starting with the RDRFBSR, the anti-alias filter is replaced with a wideband pre-select filter, and the constant RF sample clock is replaced with a frequency modulated sample clock that samples at the zero-crossing rising voltage of a frequency modulated clock. In FIG. 2, an ultra wideband (UWB) front end filter 302 is present in front of a non-quantizing RF sampler 204 to allow reception of multiple Nyquist zones. The non-quantizing RF sampler 204 uses modulated RF sample clock circuitry 304, and is followed by an analog interpolation filter 206 and an analog to digital converter (ADC) 210. The ADC 210 receives an ADC sampling clock signal 214 from ADC clock circuitry. The wideband filter 302 has a bandwidth that is wide enough to pass multiple Nyquist zones where the Nyquist zones are determined by the RF sampling clock frequency for the non-quantizing RF sampler 204. The modulated sample clock circuitry 304 provides an RF sampling clock signal to the non-quantizing RF sampler 204 that is not constant and is adjusted or modulated during sampling.

As with RDRFBSR architectures, the NYFR architecture can suffer from ADC induced spurs as well as signal leakage outside the desired wideband pre-select filter bandwidth.

FIG. 3 (Prior Art) shows the input/output characteristics of the NYFR. In particular, an input signal has an induced modulation $M\Theta(t)$, where M depends on the Nyquist zone in which the signal originated. Thus, a broadband RF input can be sampled at far less than Nyquist, allowing individual signals from different Nyquist zones to alias (or fold) into the analog interpolation filter. The original RF frequency from which each signal aliased can then be determined without ambiguity by measuring M.

FIG. 4 (Prior Art) illustrates the principles of the NYFR via a frequency domain example. The Fourier transform of the pulse train, shown in the right side of FIG. 4 (Prior Art), is convolved with the input spectra after the wideband RF filter, which is shown at top left. It is noted that the Fourier transform of the pulse train consists of a series of impulse-like signals with increasing width. For example, the width at $0 f_{S1}$ is 0; the width at $1f_{S1}$ is the modulation bandwidth; the width at $2f_{S1}$ is 2×the modulation bandwidth; etc. When these are convolved with the input spectra, the resulting spectra has modulation bandwidth corresponding to Nyquist zone of origin as shown in the lower left hand side of FIG. 4 (Prior Art). It is noted that the numbers on the left side of FIG. 4 (Prior Art) correlate to the numbers in FIG. 2 (Prior Art) and show the positions within the circuitry where the signals in FIG. 4 (Prior Art) are present.

One problem suffered by the RDRFBSR and NYFR architectures can be ADC induced spurs. For reducing ADC spurs, prior attempts have focused on the ADC itself by attempting to provide linear and/or non-linear equalization thereby leading to ADCs with greater linearity. However, these ADCs suffer from higher cost and/or higher power requirements.

Other prior attempts have been based on various dithering techniques, including ADC clock dithering, injection of low level white noise, and injection of out-of-band colored noise which is later removed by filtering. While these techniques help remove quantization spurs and help reduce some other non-linearities caused by sampling a pure periodic signal, they do not reduce ADC spurs adequately in most cases where high linear dynamic range is desired.

SUMMARY OF THE INVENTION

The systems and methods disclosed herein provide improved spur reduction architectures that improve linearity in direct radio frequency (RF) receiver architectures. Non-uniform sampling in the form of sampling clock phase (or frequency) modulation is used to induce phase (or frequency) modulation on signals that are being received from a given Nyquist zone. In this context, the Nyquist zone is defined by integer multiples of Fs/2, where Fs is the average RF sample rate. At the output of the ADC (analog-to-digital converter), the signals are de-modulated to remove the induced modulation based on the Nyquist zone that is being received. Non-desired interfering signals from a non-desired Nyquist zone that leak past the anti-aliasing filter as well as many ADC spurs have a different induced modulation than desired signals from the given Nyquist zone. The de-modulation process results in these non-desired spurious artifacts (interfering leakage signals and ADC spurs) being spread in the frequency domain. For the case of strong spurious artifacts, the artifact can be removed after measuring the induced modulation and de-modulating. For the case of weak spurious artifacts, the de-modulation for the desired Nyquist zone will spread these signals in the frequency domain. In either case, increased spur-free dynamic range is achieved, where these un-desired artifacts or interfering leakage signals are treated as spurs. As an additional minor benefit, the induced modulation on signals also provides a dithering effect on the ADC, Thus, quantization spurs and related spurs caused by sampling a pure sinusoid are removed or reduced similar to conventional dithering techniques.

In one respect, disclosed herein is receive path circuitry for a bandpass sampling receiver having decoupled quantization, including: bandpass filter circuitry configured to select a Nyquist zone band, the bandpass filter circuitry having a center frequency within a frequency range of interest; non-quantizing sampling circuitry configured to receive a filtered signal from the bandpass filter circuitry and to receive a frequency modulated RF sampling clock as an input, the frequency modulated RF sampling clock meeting Nyquist sampling criteria of the bandpass filter but not meeting Nyquist sampling criteria of the total frequency range of interest, the frequency modulated RF sampling clock resulting in a known induced modulation on signals of interest received from a given Nyquist zone band selected by the bandpass filter circuitry during the bandpass sampling process and a different induced modulation on any signal leaking past the bandpass filter circuitry from a Nyquist zone band different from the given selected Nyquist zone band; an analog interpolation filter coupled to receive the output of the non-quantizing sampling circuitry, the analog interpolation filter having a center frequency within a folded Nyquist zone of operation for the non-quantizing sampling circuitry; analog to digital converter (ADC) circuitry configured to receive a quantization sampling clock signal and to quantize an analog signal received from the analog interpolation filter to produce a digital output signal; and demodulation circuitry configured to receive a digital signal that is based at least in part on the digital output signal of the ADC circuitry, and to demodulate the received digital signal based upon the known induced modulation for the given selected Nyquist zone.

In another respect, disclosed herein is a method for direct sampling of signals, including: utilizing a bandpass filter to select a Nyquist zone band and filter a signal within a frequency range of interest; bandpass sampling a filtered signal from the bandpass filter circuitry without quantizing the signal according to a frequency modulated RF sampling clock signal that meets Nyquist criteria for the bandpass filter but does not meet Nyquist criteria for the total frequency range of interest to result in a known induced modulation on a signal of interest received from the given Nyquist zone band selected by the bandpass filter circuitry during the bandpass sampling process and a different induced modulation on any signal leaking past the bandpass filter circuitry from a Nyquist zone band different from the given selected Nyquist zone band; filtering the bandpass sampled signal with an analog interpolation filter having a center frequency within a folded Nyquist zone of operation; quantizing an analog signal received from the analog interpolation filter to produce a digital output signal; and demodulating a digital signal that is based at least in part on the digital output signal and based upon the known induced modulation for the given selected Nyquist zone.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

Figure 1:
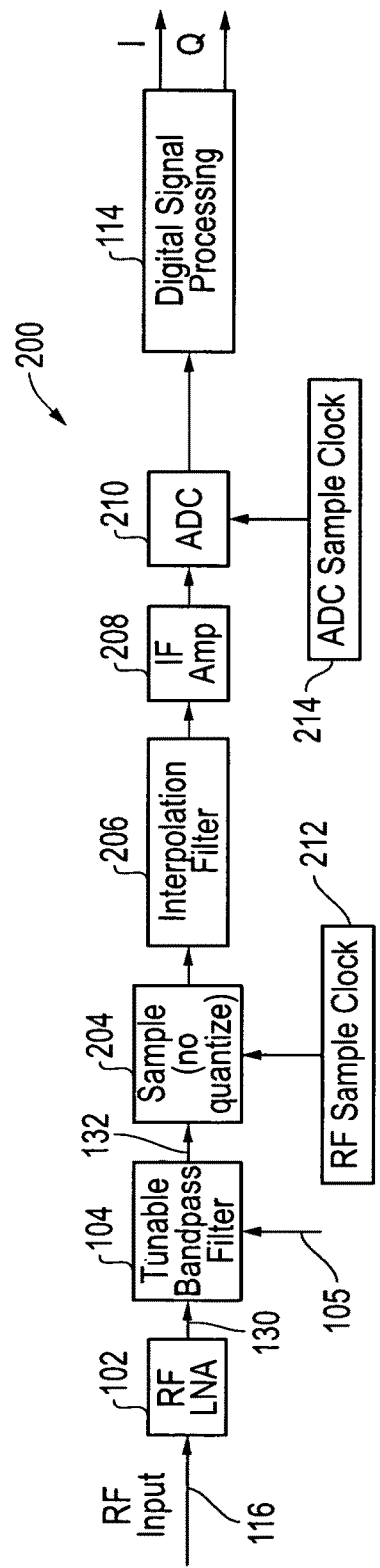
FIG. 1 (Prior Art) is a block diagram for a reconfigurable direct RF bandpass sampling receiver (RDRFBSR).
Figure 2:
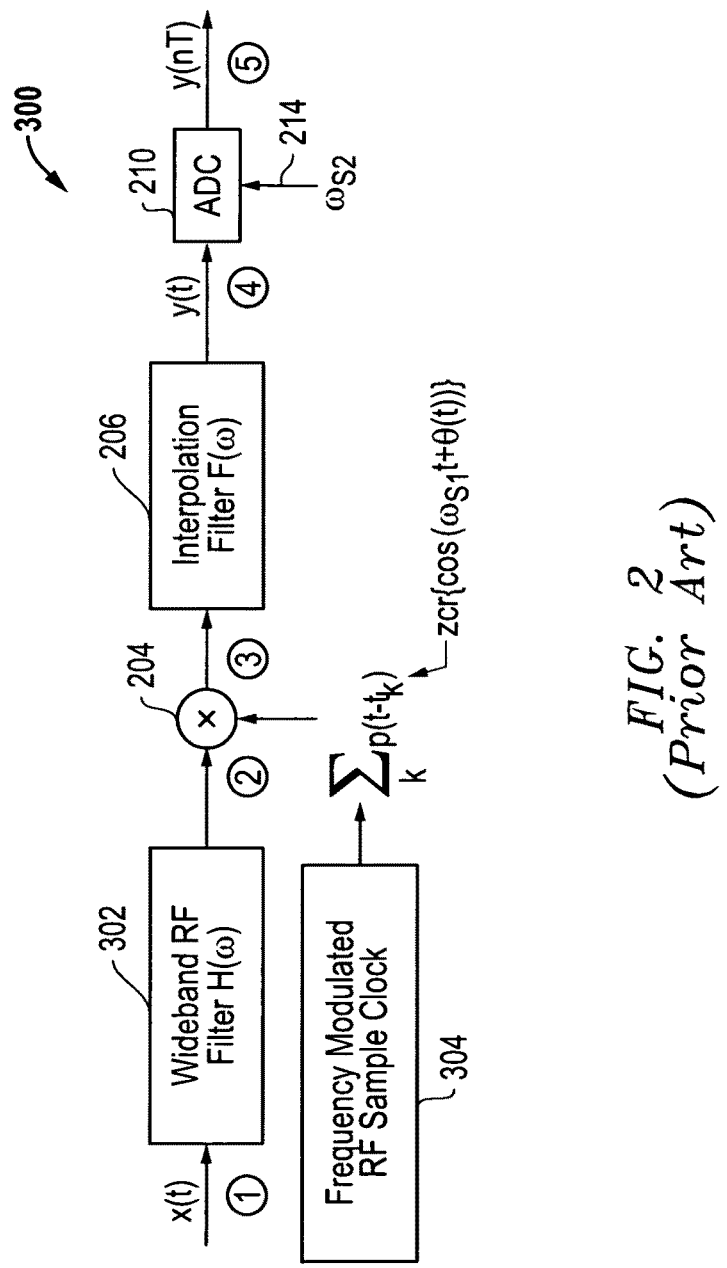
FIG. 2 (Prior Art) is a block diagram for a Nyquist folding receiver (NYFR).
Figure 3:
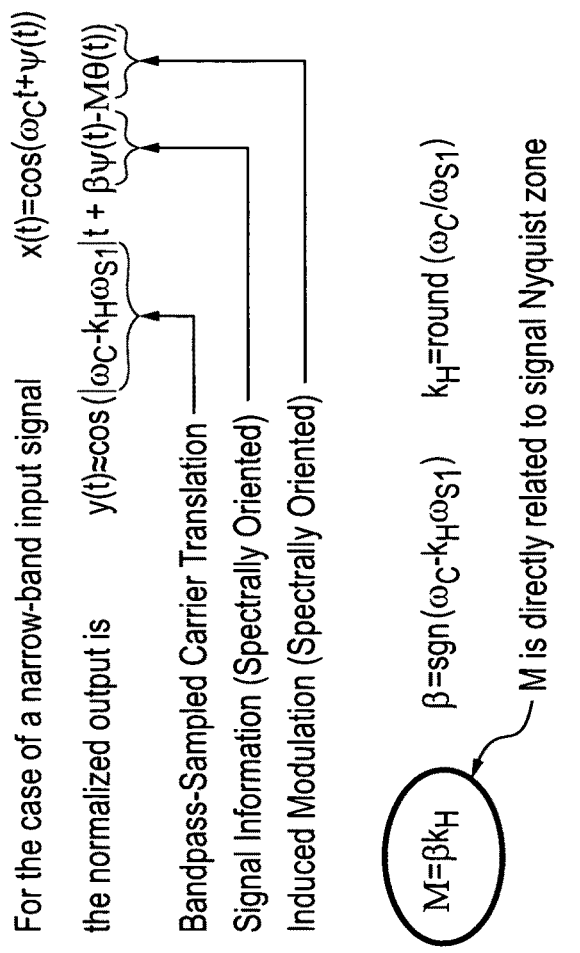
FIG. 3 (Prior Art) provides an explanation of mathematical expressions associated with the NYFR signals.
Figure 4:
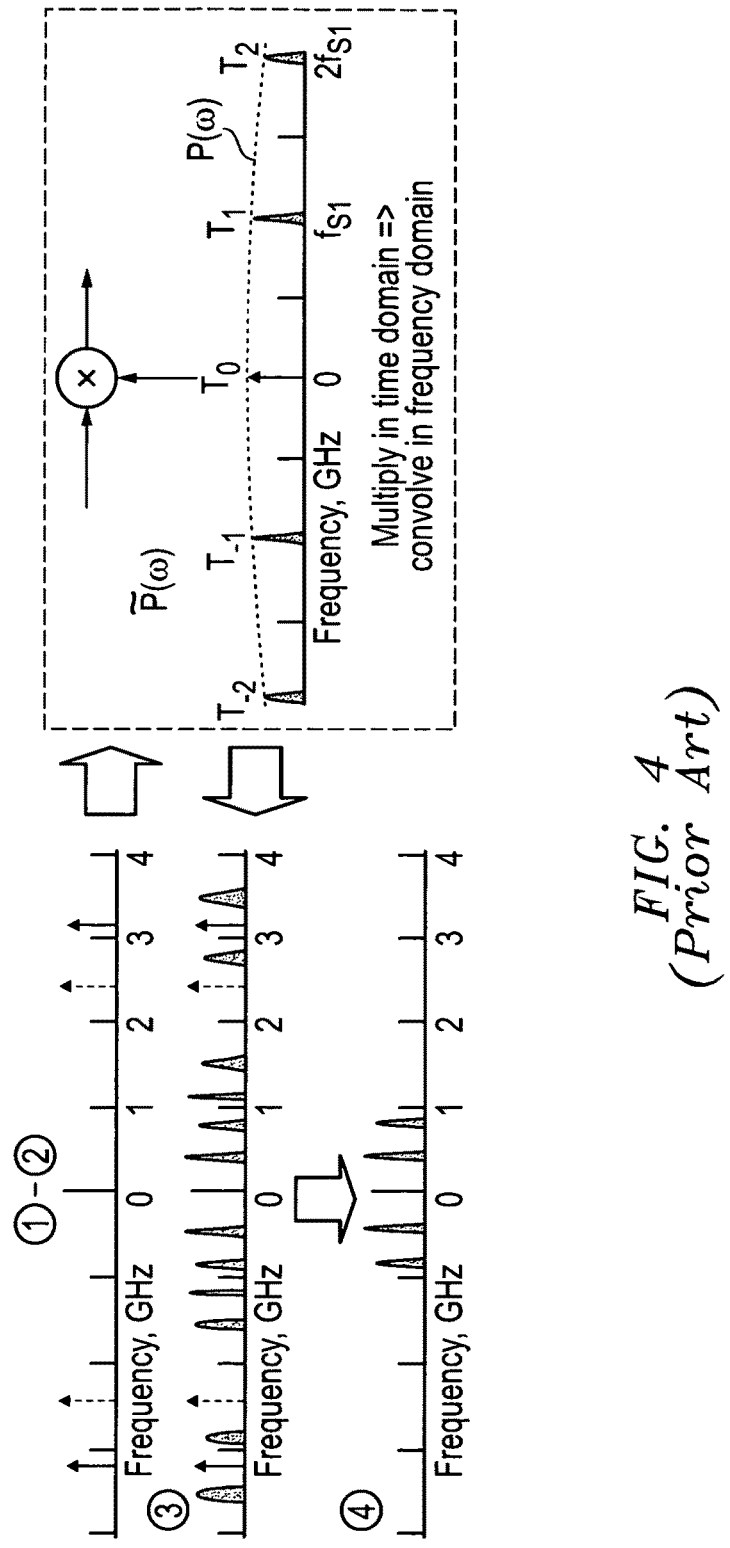
FIG. 4 (Prior Art) is a signal diagram for signal processing provided by the NYFR of FIG. 2.

The systems and methods disclosed herein provide improved spur reduction architectures that reduce spurs and improve linearity in direct radio frequency (RF) receiver architectures. As described further below, these spur reduction architectures described herein provide improved receiver performance. For example, the architectures improve receiver performance by providing reductions of certain types of spurs, such as ADC tonal spurs, thereby making the receiver operation more linear. The architectures also ease requirements for anti-alias filters, particularly those used in bandpass sampling receivers, due to improved out-of-band rejection thereby making the receiver operation more linear with respect to desired band. And the architectures in effect perform a type of signal dithering thereby improving the linearity of the receiver ADC processing. These spur reduction and linearity improvements result from inducing a different modulation on non-desired leakage interfering signals and ADC spurs than on desired signals, followed with digital processing at a later step.

It is noted that the spur reduction architectures described herein relate to de-jitter architectures described in U.S. Provisional Patent Application Ser. No. 61/203,114 filed Dec. 18, 2008 and in the concurrently filed U.S. patent application Ser. No. 12/592,776 entitled "SYSTEM AND METHOD FOR CLOCK JITTER COMPENSATION IN DIRECT RF RECEIVER ARCHITECTURES" by Fudge et al., each of which is hereby incorporated by reference in its entirety. As indicated above, the spur reduction architectures described herein are also related to the receiver architectures described in U.S. Pat. No. 7,436,910, entitled "DIRECT BANDPASS SAMPLING RECEIVERS WITH ANALOG INTERPOLATION FILTERS AND RELATED METHODS," and U.S. patent application Ser. No. 7,436,912, entitled "NYQUIST FOLDED BANDPASS SAMPLING RECEIVERS AND RELATED METHODS," each of which is hereby incorporated by reference in its entirety.

The spur reduction embodiments described below with respect to FIGS. 5A and 5B can be configured to use a frequency modulated sample clock as described with respect to the NYFR architectures of U.S. Pat. No. 7,436,912. As recognized for the spur reduction architectures described herein, the digital data can then be processed as separate channels (e.g., one per Nyquist zone of interest) by performing the conjugate of the frequency modulation induced for the signal band of interest. This processing will mitigate many of the system spurs, and ADC spurs in particular. Based on the induced modulation, the Nyquist zone spurs and leakage (including ADC spurs from Nyquist zone zero) can be determined. For strong spurs and leakage, the digital data can be processed by performing the conjugate of the frequency modulation induced for the spurious signals. These spurious signals can then be removed in the frequency domain. Then the digital data can be re-processed by performing the conjugate of the frequency modulation induced for the signal band of interest. Thus, the spur reduction architectures described herein allow identification of out-of-band leakage past the anti-alias filter and reduction of peak spectral magnitude. As such, anti-alias filter requirements can be eased, and this easing of anti-alias filter requirements is particularly useful in RDRFBSR receivers having tunable or switchable filters because it is hard to get tight filter skirts for these receivers. These spur reduction techniques can also be used with respect to NYFR architectures.

Figure 5A:
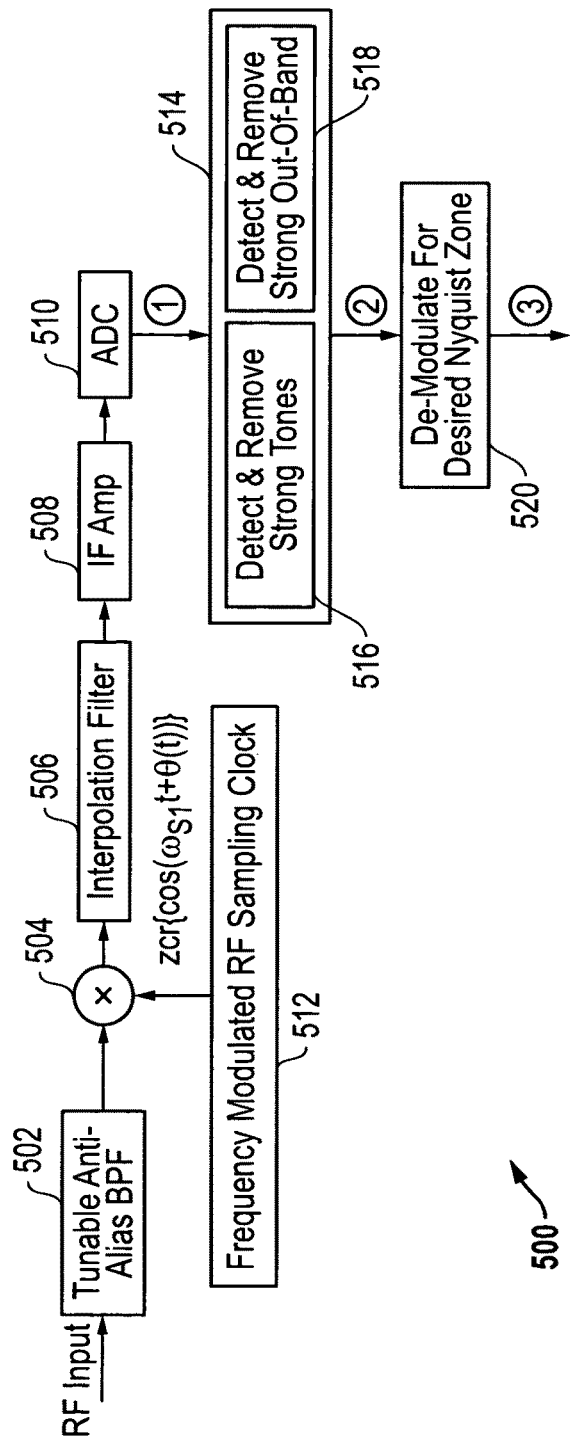
FIG. 5A is a block diagram for a receiver architecture including spur reduction.

FIG. 5A is a block diagram for a receiver architecture including spur reduction. And FIG. 5B provides an explanation of the mathematical expressions associated with the signal processing of FIG. 5A.

FIG. 5A depicts a block diagram for an embodiment 500 of the spur reduction architecture applied to a RDRFBSR architecture, such as those described in U.S. Pat. No. 7,436,910. The following changes are made, however, to reduce spurs: (1) addition of a narrow-band phase or frequency modulation (FM) to the RF sample clock and (2) addition of processing block(s) to remove strong tones and/or strong out-of-band leakage signals after the ADC processing. Further, demodulation can be provided for the desired Nyquist zone of interest.

As shown in FIG. 5A, an RF input signal is provided to a tunable anti-alias band pass filter (BPF) 502. The output of filter 502 is then sampled in sampler 504 using a frequency modulated RF sampling clock 512. The output of sampler 504 is passed through interpolation filter 506, intermediate frequency (IF) amplifier 508 and analog-to-digital converter (ADC) 510 to provide a digital output signal, which is designated as signal point "1" in FIG. 5A. This digital output signal is then processed by spur reduction processing block 514. Spur reduction processing block 514 can include processing block 516 to detect and remove strong tones and/or processing block 518 to detect and remove strong out-of-band signals. The output of spur reduction processing block 514 is designated as signal point "2" in FIG. 5A. This signal is then processed by processing block 520 to de-modulate the signal for a desired Nyquist zone. The output of processing block 512 is designated as signal point "3" in FIG. 5A.

The addition of a frequency modulation (e.g., narrow-band frequency modulation) to the RF sample clock in block 512 results in a known induced modulation, $M_1 \Theta(t)$, on signals of interest from the Nyquist zone that is being received. The desired Nyquist zone is the Nyquist zone band that is selected by the tunable anti-alias filter in the bandpass sampling process. This narrow-band frequency modulation also induces a different modulation, $M_2 \Theta(t)$, on any signal from a different Nyquist zone that may be leaking past the anti-alias filter.

The additional digital processing blocks 516 and 518 are added after the ADC to detect and remove strong tones and/or to detect and remove strong out-of-band signals. In operation, the ADCs can generate tone-like spurs. Because the signals of interest have an induced modulation, the ADC spurs can be identified by looking for any tones with no induced modulation. Although this step is optional, by removing any strong ADC spurs, the dynamic range of the receiver can be further improved. It is noted that other non-desired artifacts, such as clock leakage, will also result in narrow-band artifacts that can be similarly identified and removed in this step. There is no need to distinguish between the exact causes of the artifact. More simply, any narrow-band tones at this stage can be considered to be non-desired artifacts and not signals of interest.

Figure 5B:
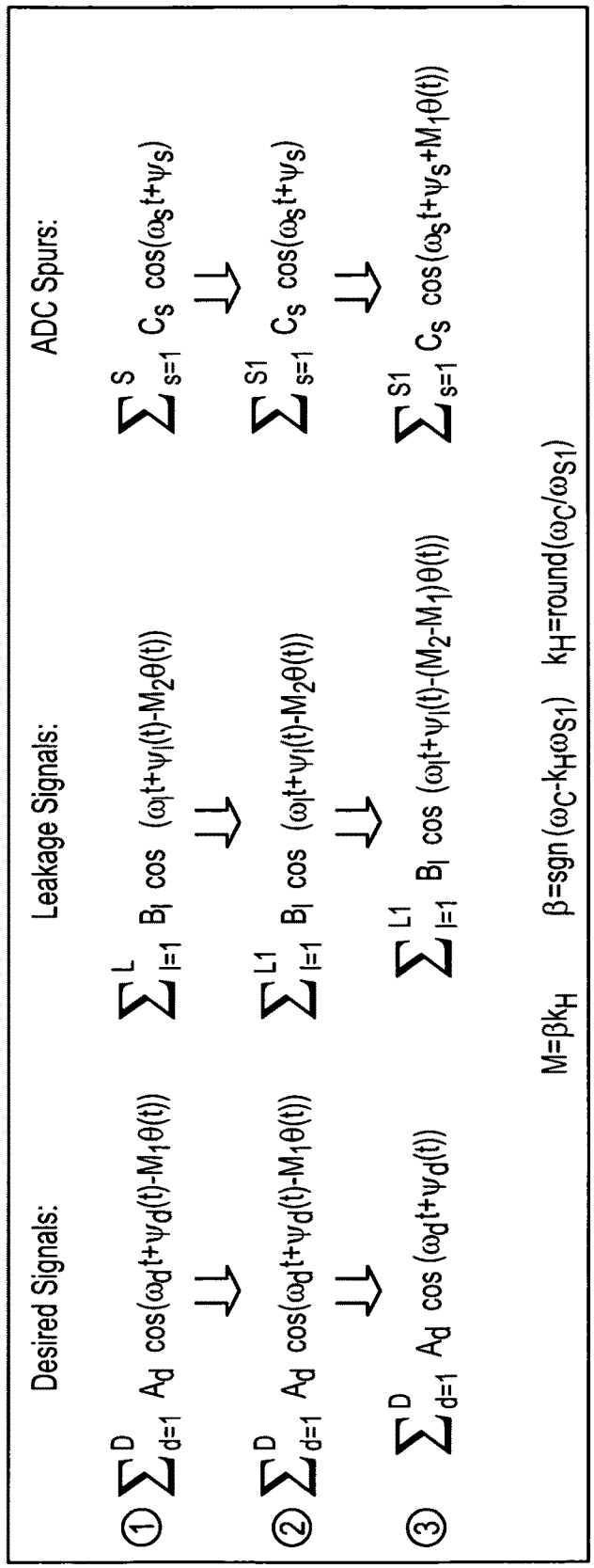
FIG. 5B provides an explanation of the mathematical expressions associated with the signal processing of FIG. 5A.

FIG. 5B provides equations representing signals at the three signal points set forth in FIG. 5A. In particular, FIG. 5B provides representations for desired signals, leakage signals and ADC induced spurs at these three signal points.

In FIG. 5B, removal of strong ADC spurs is indicted by the number of ADC spurs being reduced from S to S1 (S1≦S). Strong out-of-band interferers can also be removed by measuring the induced modulation (i.e., measure M), de-modulating for the Nyquist zone of the interferer, and removing the interfering signal. This final step may be performed by digital notch filtering or equivalent steps such as removal in the frequency domain followed by inverse Fourier transform. In FIG. 5B, removal of strong interfering leakage signals is indicated by the number of leakage signals being reduced from L to L1 (L1≦L).

Looking back to FIG. 5A, it is noted that processing block 520 can be included, if desired, for demodulation of the digital signal for a desired Nyquist zone. In this processing block, demodulation is conducted based upon the known induced modulation for the Nyquist zone of interest. This additional step not only allows for the recovery of the desired signal, it also results in the frequency domain spreading of any remaining non-desired leakage signals or ADC spurs that were not removed in block 514 and subsequent improvement in ability to detect weak desired signals of interest. In cases where the leakage is from an adjacent Nyquist zone, the modulation spreading factor is opposite in sign to the modulation spreading factor of the desired Nyquist zone. When these adjacent leakage signals go through the demodulation processing, they are spread even further in the frequency domain. This demodulation step, therefore, results in the further spreading of any residual ADC spurs that were not removed in the prior processing blocks.

The spur reduction architectures described herein provide unique and advantageous features. These unique features include, for example, the use of narrow-band frequency modulated sampling to identify and remove out-of-band leakage and to identify and remove ADC tonal spurs. Unique features also include the use of RF sample clock dithering (as opposed to ADC clock dithering or adding a small amount of noise to the ADC input) for a reconfigurable direct RF architecture. Advantages of the spur reduction architectures include providing a simple approach to reduce and remove effects of ADC tonal spurs and providing a simple approach to identify and remove effects of out-of-band leakage. The latter advantage significantly eases the requirements for anti-aliasing filters. In addition, in case of very strong interferers that are out-of-band, the ability to identify out-of-band signals provides a method of identifying and removing these strong interferers. A further advantage of the spur reduction architectures is that the frequency modulation on the RF sample rate results in non-periodic input into the ADC. This FM modulation improves the linearity of the system in the same way that dithering the ADC clock does. It noted that dithering the ADC clock is different than dithering the RF sample clock as set forth in this architecture. It is further noted that while some of these discussions focus on RDRFBSR receivers, the techniques described herein can also be used with NYFR receivers.

Differences between the operation of the prior RDRFBSR of U.S. Pat. No. 7,436,910 and the operation of the spur reduction embodiment of FIG. 5A are further illustrated with respect to FIGS. 6-9 below. As described below, without using the spur reduction techniques of FIGS. 5A and 5B, a weaker signal can be completely hidden by spurs. This result can occur using the RDRFBSR architecture of U.S. Pat. No. 7,436,910 and/or the NYFR architecture of U.S. Pat. No. 7,436,912. In contrast, using the spur reduction techniques described herein, the weaker signal can be made much more clearly visible. For example, spurs can be reduced by 25 dB thereby providing a measured spur-free dynamic range of over 75 dB (i.e., maximum spur in this Nyquist zone was at least 75 dB below full scale).

It is noted that for the examples in FIGS. 6-9, the average RF sample rate is 2005 Msps. The ADC is an Analog Devices 12-bit AD9430 sampling at 213.333 Msps. The interpolation filter has a 70 MHz 3-dB bandwidth and is centered at 160 MHz. The digital bandwidth for these data sets has been converted from 106.667 MHz to 80 MHz to better match the bandwidth of the interpolation filter. For this example, each Nyquist zone is slightly over 1 GHz wide (2005/2=1002.5 MHz). Since the final output is only about 70 MHz wide, not all of the Nyquist zone is seen. The FFT (fast Fourier transform) size in all examples is $2^{18}$=262,144, thus providing about 54 dB of processing gain into the noise floor.

Figure 6:
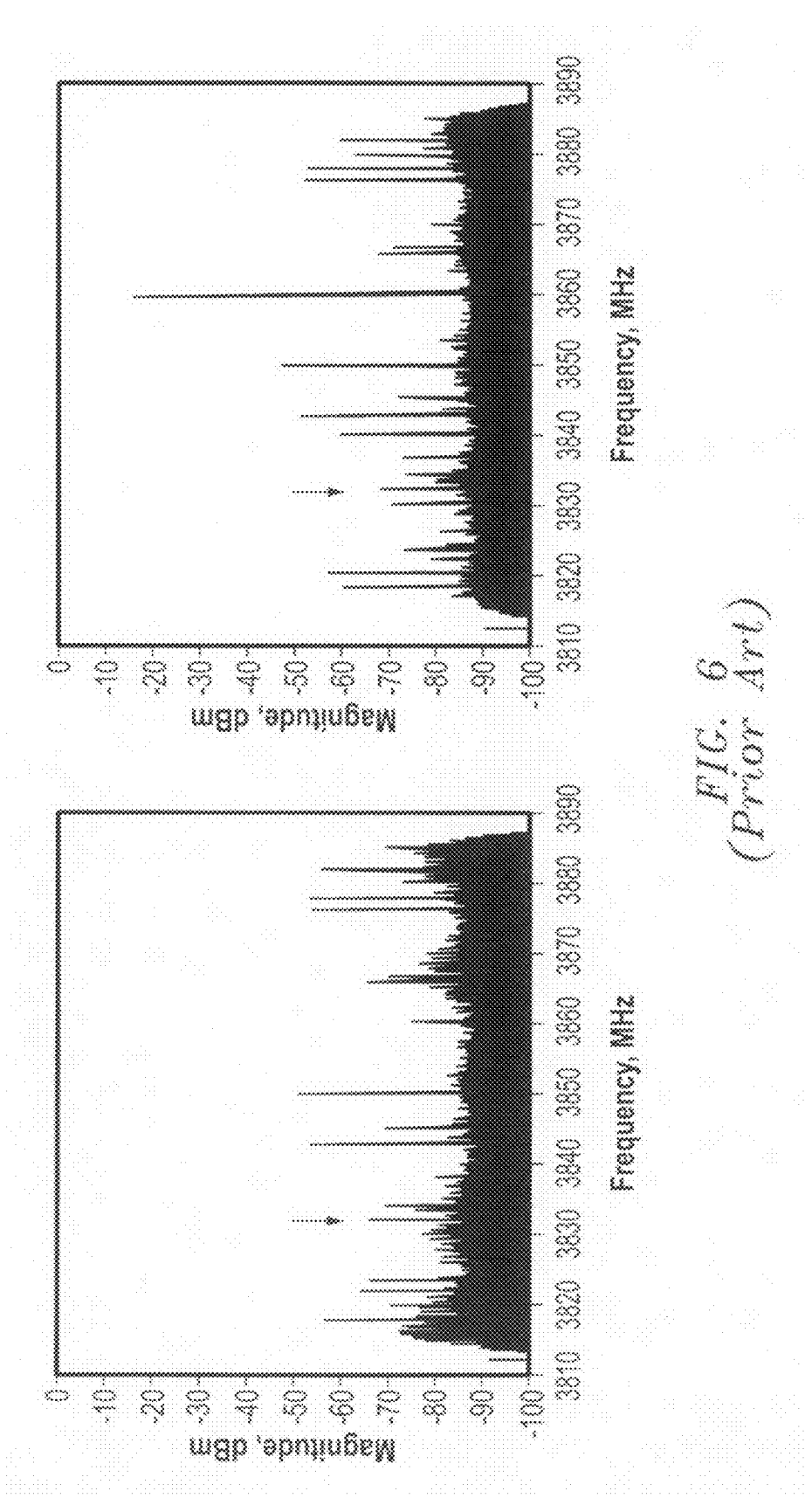
FIGS. 6-9 provide example signal responses showing the advantageous operation of the architectures of the spur reduction embodiments.

FIG. 6 (Prior Art) shows two examples for a RDRFBSR architecture similar to that shown in FIG. 1 (Prior Art) with a uniform RF sample rate. In this example, there is a signal of interest at 3832 MHz at −70 dBm, or about −26 dB SNR. In the left panel, there are a number of ADC spurs visible, many of which are stronger than the signal of interest. In the right panel, there is also a very strong interfering signal at 2155 MHz leaking past the anti-alias filter. This particular interfering signal folds (or aliases) to an apparent frequency of 3860 MHz. With prior solutions, it is not possible to tell that this signal is an interfering signal from a different Nyquist zone. Normally, the signal leakage would not be this strong. This particular example, however, serves well to illustrate the improvement in linear dynamic range provided by the spur reduction embodiments described below. Based on the RF sample rate, the signal of interest lies in Nyquist zone #3 (M=−2), and the leakage signal lies in Nyquist zone #2 (M=1).

Figure 7:
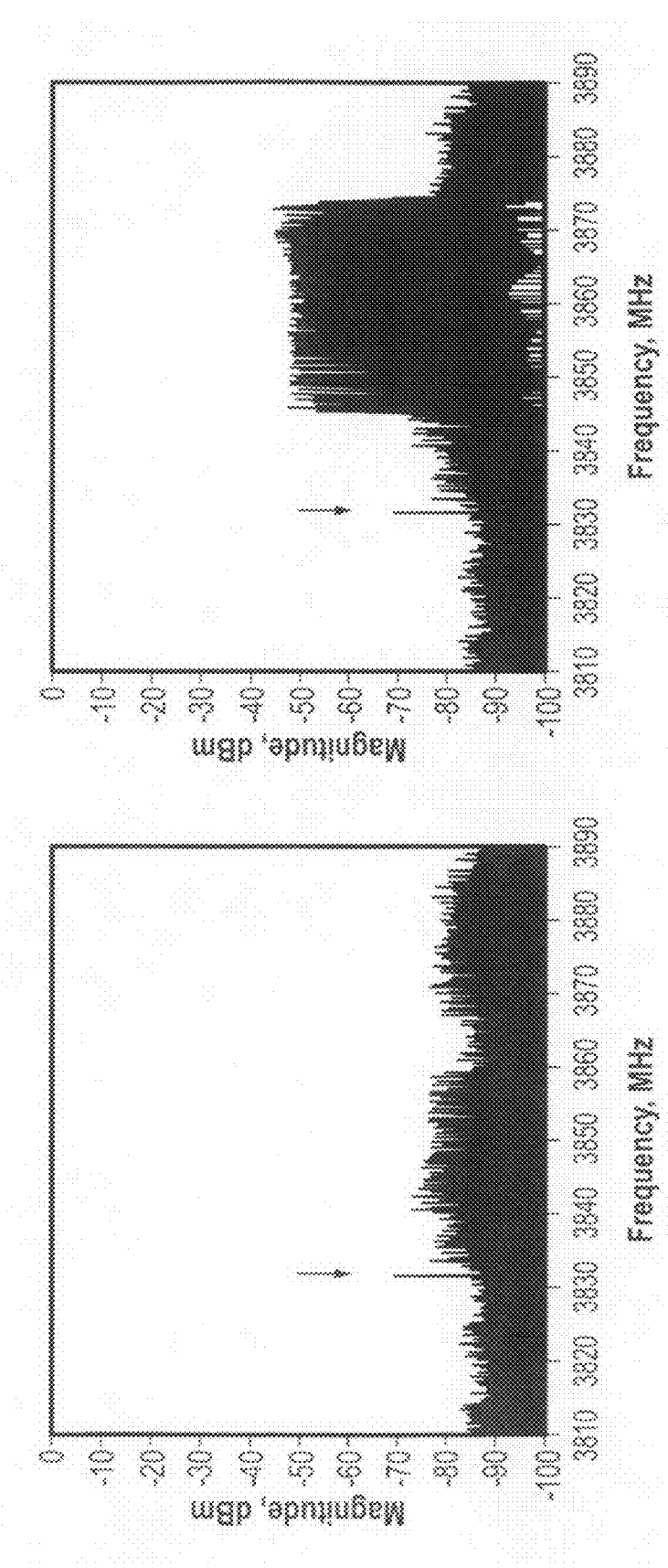
Figure 8:
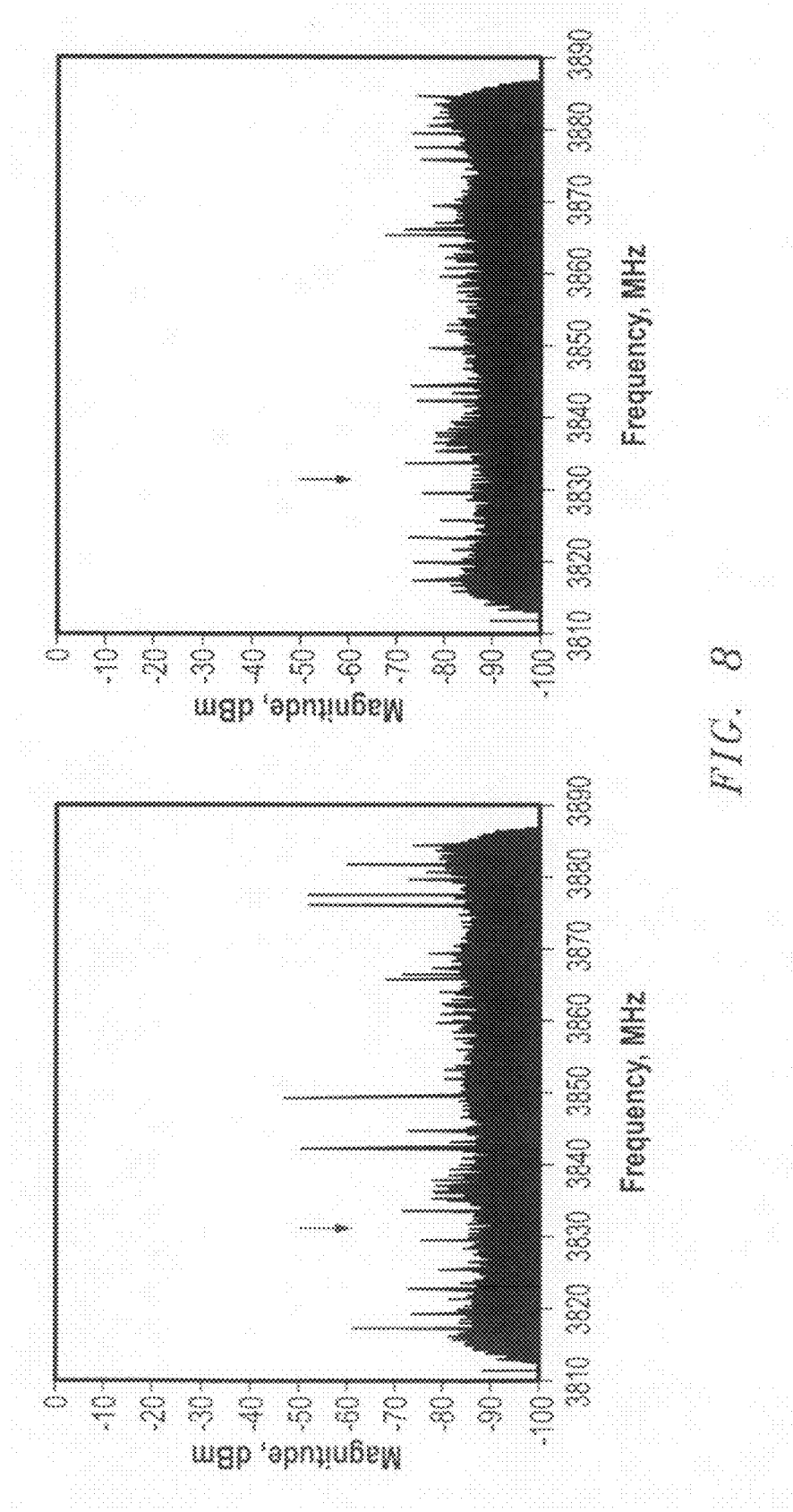
Figure 9:
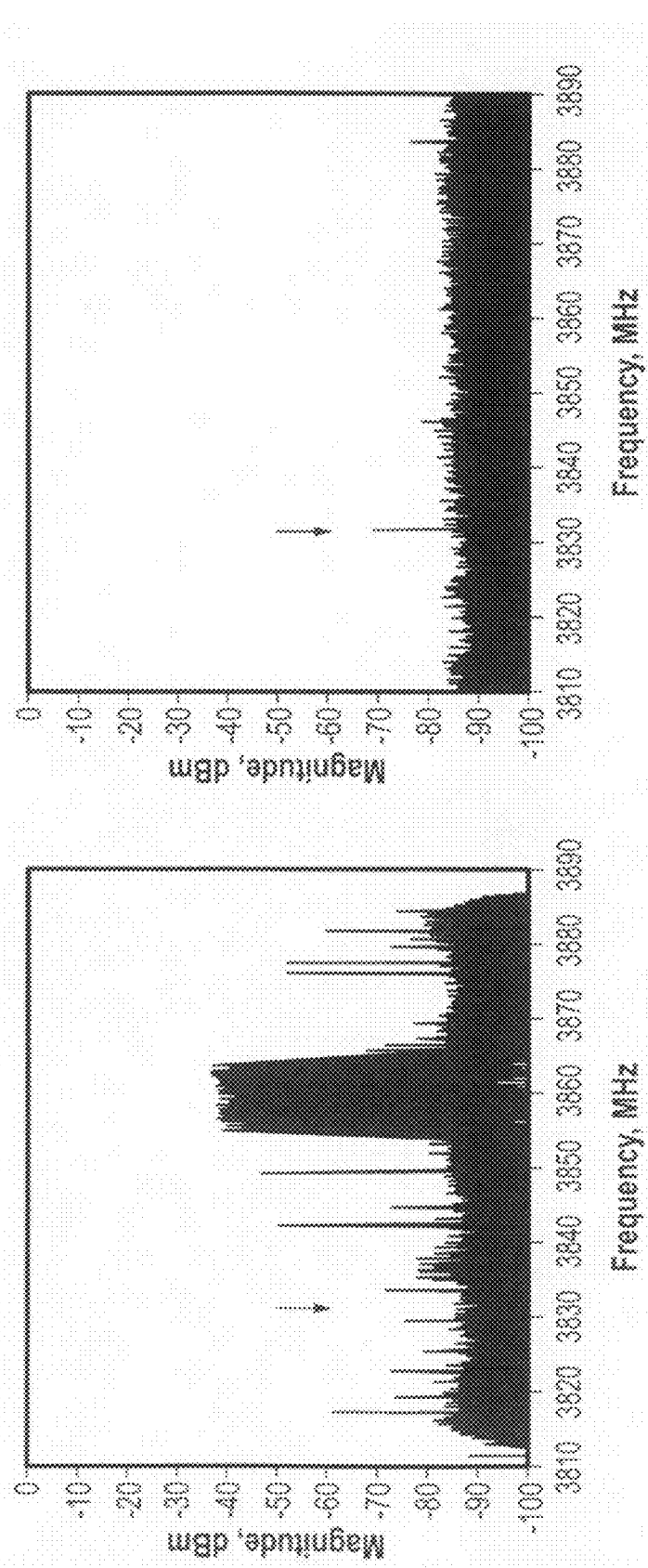

FIG. 7 shows the partial improvement in linear dynamic range provided by the spur reduction architecture described herein without the ADC spur removal and/or leakage signal removal steps of processing block 516 and 518. Only the FM modulated sampling clock and demodulation for desired Nyquist zone provided by processing block 520 are used. In the case of ADC spurs only (left panel), the improvement is dramatic as the signal of interest is now stronger than all ADC tonal spurs after spreading. For the case of the strong leakage with ADC spurs (right panel), however, the signal of interest may still be detected in this example. Further, if the leakage signal folds (or aliases) close to the signal of interest, it would likely not be possible to detect the signal of interest. However, as can be seen by the right hand panel of FIG. 7, the fact that there is a strong interfering signal leaking past the anti-alias filter is readily detected by the fact that after de-modulation, this signal has significant modulation remaining. In fact, it is possible to directly measure the induced modulation and determine the Nyquist zone of origin and to then de-modulate for this Nyquist zone and remove the interferer. As such, it is seen that the processing provided by processing block 516 and 518 is desirable to improve the output signal quality. FIG. 8 and FIG. 9 provide examples of the improvements provided by these processing blocks.

FIG. 8 shows in the left panel the output of the spur reduction architecture of FIG. 5A at signal point "1" for the case of ADC spurs only. Note that the signal of interest is spread (since this is before de-modulation) and is not detectable. The right panel shows the results after removal of strong ADC spurs at signal point "2" in FIG. 5A.

FIG. 9 shows in the left panel the output at signal point "1" in FIG. 5A for the case of ADC spurs and strong leakage. The right panel shows the results at signal point "3" in FIG. 5A after ADC spur/leakage removal and final de-modulation for the Nyquist zone of interest. The signal of interest is now readily identifiable.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. Receive path circuitry for a bandpass sampling receiver having decoupled quantization, comprising:
   bandpass filter circuitry configured to select a Nyquist zone band, the bandpass filter circuitry having a center frequency within a frequency range of interest having a total frequency range;
   non-quantizing sampling circuitry configured to receive a filtered signal from the bandpass filter circuitry and to receive a frequency modulated RF sampling clock as an input, the frequency modulated RF sampling clock meeting Nyquist sampling criteria of the bandpass filter but not meeting Nyquist sampling criteria for the total frequency range of the frequency range of interest, the frequency modulated RF sampling clock resulting in a known Nyquist zone-induced modulation from the sampling clock on signals of interest received from a given Nyquist zone band selected by the bandpass filter circuitry during the bandpass sampling process and a different Nyquist zone-induced modulation from the sampling clock on any signal leaking past the bandpass filter circuitry from a Nyquist zone band different from the given selected Nyquist zone band;

an analog interpolation filter coupled to receive the output of the non-quantizing sampling circuitry, the analog interpolation filter having a center frequency within a folded Nyquist zone of operation for the non-quantizing sampling circuitry;

analog to digital converter (ADC) circuitry configured to receive a quantization sampling clock signal and to quantize an analog signal received from the analog interpolation filter to produce a digital output signal; and demodulation circuitry configured to receive a digital signal that is based at least in part on the digital output signal of the ADC circuitry, and to demodulate the received digital signal based upon the known Nyquist zone-induced modulation from the sampling clock for the given selected Nyquist zone band.

2. The receive path circuitry of claim 1, further comprising processing circuitry coupled to receive the digital output signal from the ADC circuitry, the processing circuitry being configured to detect and remove at least one of ADC spur tones, out-of-band signals, or a combination thereof from the digital output signal to produce a digital signal based on the digital output signal that is provided to the demodulation circuitry.

3. The receive path circuitry of claim 2, wherein the processing circuitry is configured to identify and remove any signal artifacts in the digital output signal from the ADC circuitry that have no induced modulation.

4. The receive path circuitry of claim 3, wherein the signal artifacts comprise at least one of ADC spur tones, clock leakage, or a combination thereof.

5. The receive path circuitry of claim 1, further comprising processing circuitry coupled to receive the digital output signal from the ADC circuitry, the processing circuitry being configured to measure Nyquist zone-induced modulation from the sampling clock of a signal in the digital output signal from the ADC circuitry; demodulate for the Nyquist zone band of an interfering signal to remove the Nyquist zone-induced modulation from the sampling clock that is present in the digital output signal from the ADC circuitry; and remove the interfering signal from the digital output signal from the ADC circuitry.

6. The receive path circuitry of claim 1, wherein the modulation of the frequency modulated RF sampling clock is a narrow-band frequency modulation (FM).

7. The receive path circuitry of claim 1, wherein the frequency modulated RF sampling clock results in a known Nyquist zone-induced modulation from the sampling clock present in the analog signal received by the ADC circuitry from the analog interpolation filter that produces a dithering effect on the analog to digital converter (ADC) circuitry.

8. The receive path circuitry of claim 1, wherein the demodulation circuitry is configured to demodulate the received digital signal based upon the known Nyquist zone-induced modulation from the sampling clock for the given selected Nyquist zone band to spread in the frequency domain any signal artifacts in the digital output signal from the ADC circuitry that have a different Nyquist zone-induced modulation from the sampling clock than the known induced modulation on signals of interest received from the given Nyquist zone band.

9. The receive path circuitry of claim 1, wherein the bandpass filter circuitry has a bandwidth less than the frequency range of interest.

10. The receive path circuitry of claim 8, wherein the demodulation circuitry is configured to spread in the frequency domain any signal artifacts in the digital output signal from a Nyquist zone adjacent to the given Nyquist zone band by a modulation spreading factor that is opposite in sign to the modulation spreading factor for the given Nyquist zone band.

11. A method for direct sampling of signals, comprising:

utilizing bandpass filter circuitry to select a Nyquist zone band and filter a signal within a frequency range of interest;

bandpass sampling a filtered signal from the bandpass filter circuitry without quantizing the signal according to a frequency modulated RF sampling clock signal that meets Nyquist criteria for the bandpass filter but does not meet Nyquist criteria for the total frequency range of the frequency range of interest to result in a known induced modulation from the sampling clock on a signal of interest received from the given Nyquist zone band selected by the bandpass filter circuitry during the bandpass sampling process and a different Nyquist zone-induced modulation from the sampling clock on any signal leaking past the bandpass filter circuitry from a Nyquist zone band different from the given selected Nyquist zone band;

filtering the bandpass sampled signal with an analog interpolation filter having a center frequency within a folded Nyquist zone of operation;

quantizing an analog signal received from the analog interpolation filter to produce a digital output signal; and producing and demodulating a digital signal that is based at least in part on the digital output signal and based upon the known Nyquist zone-induced modulation from the sampling clock for the given selected Nyquist zone band.

12. The method of claim 11, further comprising detecting and removing at least one of ADC spur tones, out-of-band signals, or a combination thereof from the digital output signal to produce the digital signal based at least in part on the digital output signal prior to demodulating the digital signal.

13. The method of claim 12, identifying and removing any signal artifacts in the digital output signal that have no induced modulation.

14. The method of claim 13, wherein the signal artifacts comprise at least one of ADC spur tones, clock leakage, or a combination thereof.

15. The method of claim 11, further comprising measuring Nyquist zone-induced modulation from the sampling clock of a signal in the digital output signal;

demodulating for the Nyquist zone band of an interfering signal to remove the Nyquist zone-induced modulation from the sampling clock that is present in the digital output signal; and removing the interfering signal from the digital output signal.

16. The method of claim 11, wherein the modulation of the frequency modulated RF sampling clock signal is a narrow-band frequency modulation (FM).

17. The method of claim 11, wherein the frequency modulated RF sampling clock signal results in a known Nyquist zone-induced modulation from the sampling clock present in the analog signal received from the analog interpolation filter that produces a dithering effect during the step of quantizing.

18. The method of claim 11, further comprising demodulating the received digital signal based upon the known Nyquist zone-induced modulation from the sampling clock for the given selected Nyquist zone band to spread in the frequency domain any signal artifacts in the digital output signal that have a different Nyquist zone-induced modulation from the sampling clock than the known induced modulation on signals of interest received from the given Nyquist zone band.

19. The method of claim 11, wherein the bandpass filter circuitry has a bandwidth less than the frequency range of interest.

20. The method of claim 18, further comprising spreading in the frequency domain any signal artifacts in the digital output signal from a Nyquist zone adjacent to the given Nyquist zone band by a modulation spreading factor that is opposite in sign to the modulation spreading factor for the given Nyquist zone band.

21. Receive path circuitry for a bandpass sampling receiver having decoupled quantization, comprising:
bandpass filter circuitry configured to select a Nyquist zone band, the bandpass filter circuitry having a center frequency within a frequency range of interest having a total frequency range;
non-quantizing sampling circuitry configured to receive a filtered signal from the bandpass filter circuitry and to receive a frequency modulated RF sampling clock as an input, the frequency modulated RF sampling clock meeting Nyquist sampling criteria of the bandpass filter but not meeting Nyquist sampling criteria for the total frequency range of the frequency range of interest, the frequency modulated RF sampling clock resulting in a known induced modulation on signals of interest received from a given Nyquist zone band selected by the bandpass filter circuitry during the bandpass sampling process and a different induced modulation on any signal leaking past the bandpass filter circuitry from a Nyquist zone band different from the given selected Nyquist zone band;
an analog interpolation filter coupled to receive the output of the non-quantizing sampling circuitry, the analog interpolation filter having a center frequency within a folded Nyquist zone of operation for the non-quantizing sampling circuitry;
analog to digital converter (ADC) circuitry configured to receive a quantization sampling clock signal and to quantize an analog signal received from the analog interpolation filter to produce a digital output signal;
demodulation circuitry configured to receive a digital signal that is based at least in part on the digital output signal of the ADC circuitry, and to demodulate the received digital signal based upon the known induced modulation for the given selected Nyquist zone; and
processing circuitry coupled to receive the digital output signal from the ADC circuitry, the processing circuitry being configured to detect and remove at least one of ADC spur tones, out-of-band signals, or a combination thereof from the digital output signal to produce a digital signal based on the digital output signal that is provided to the demodulation circuitry;
wherein the processing circuitry is configured to identify and remove any signal artifacts in the digital output signal from the ADC circuitry that have no induced modulation.

22. The receive path circuitry of claim 21, wherein the signal artifacts comprise at least one of ADC spur tones, clock leakage, or a combination thereof.

23. A method for direct sampling of signals, comprising:
utilizing bandpass filter circuitry to select a Nyquist zone band and filter a signal within a frequency range of interest;
bandpass sampling a filtered signal from the bandpass filter circuitry without quantizing the signal according to a frequency modulated RF sampling clock signal that meets Nyquist criteria for the bandpass filter but does not meet Nyquist criteria for the total frequency range of the frequency range of interest to result in a known induced modulation on a signal of interest received from the given Nyquist zone band selected by the bandpass filter circuitry during the bandpass sampling process and a different induced modulation on any signal leaking past the bandpass filter circuitry from a Nyquist zone band different from the given selected Nyquist zone band;
filtering the bandpass sampled signal with an analog interpolation filter having a center frequency within a folded Nyquist zone of operation;
quantizing an analog signal received from the analog interpolation filter to produce a digital output signal;
producing and demodulating a digital signal that is based at least in part on the digital output signal and based upon the known induced modulation for the given selected Nyquist zone band;
detecting and removing at least one of ADC spur tones, out-of-band signals, or a combination thereof from the digital output signal to produce the digital signal based at least in part on the digital output signal prior to demodulating the digital signal; and
identifying and removing any signal artifacts in the digital output signal that have no induced modulation.

24. The method of claim 23, wherein the signal artifacts comprise at least one of ADC spur tones, clock leakage, or a combination thereof.

* * * * *